Nov. 11, 1969 J. H. EMERSON 3,477,071
DEVICE FOR AUTOMATICALLY SHIFTING THE BODY OF A PATIENT
Filed Oct. 14, 1968 6 Sheets-Sheet 1

INVENTOR.
JOHN H. EMERSON
BY
Dike, Thompson, & Bronstein
ATTORNEYS

Nov. 11, 1969  J. H. EMERSON  3,477,071
DEVICE FOR AUTOMATICALLY SHIFTING THE BODY OF A PATIENT
Filed Oct. 14, 1968  6 Sheets-Sheet 3

INVENTOR.
JOHN H. EMERSON
BY
Dike, Thompson & Bronstein
ATTORNEYS

Nov. 11, 1969  J. H. EMERSON  3,477,071
DEVICE FOR AUTOMATICALLY SHIFTING THE BODY OF A PATIENT
Filed Oct. 14, 1968  6 Sheets-Sheet 4

INVENTOR.
JOHN H. EMERSON
BY
*Dike, Thompson & Bronstein*
ATTORNEYS

3,477,071
DEVICE FOR AUTOMATICALLY SHIFTING THE
BODY OF A PATIENT
John H. Emerson, 44 Hopkins Road,
Arlington, Mass. 02174
Continuation-in-part of application Ser. No. 655,125,
July 21, 1967. This application Oct. 14, 1968, Ser.
No. 777,953
Int. Cl. A61g 7/10; A47c 27/10
U.S. Cl. 5—61
28 Claims

ABSTRACT OF THE DISCLOSURE

A device for automatically and periodically shifting the position of the body of a bed patient by means of inflatable and deflatable cells applied to the patient's body so that inflation of one cell with simultaneous deflation of another will move the part of the body to which such one cell is applied relative to the part of the body to which the other cell is applied, to thereby shift the position of the body, and a mechanism for automatically and alternately inflating and deflating such cells according to a predetermined cycle to thereby shift the position of the body automatically and periodically according to a predetermined cycle.

The cells are alternately inflated and deflated automatically without shifting control valves by means of a pair of turbine wheel blowers, one of which is connected to one cell and the other of which is connected to the other cell, switch means for alternately and cyclically turning on one blower and turning off the other and timer means for controlling the switch means to control the cyclical time during which each blower is turned on. Each blower is effective to blow air from the atmosphere into its cell to thereby inflate the cell when turned on and allows free passage of gas therethrough from its cell in the reverse direction when it is subsequently turned off to thereby cause deflation of the cell. Thus, communication is provided between the cells and the atmosphere at all times during cyclical operation and no shifting control valving is necessary.

These blowers are useful not only with cells which shift the position of the patient's body but also with a plurality of cells applied to the patient's body in such a way that alternating inflation and deflation of alternating cells will apply and release pressure to and from small alternating areas of the patient's body without actually shifting the position of the body in space.

---

This application is a continuation-in-part of my patent application Ser. No. 655,125 filed July 21, 1967, and now abandoned.

Brief summary of the invention

This invention relates to a device for safely and periodically shifting, preferably automatically, the position of the human body, particularly of bedridden patients, or major portions thereof, such as legs, torso, arms, etc., and for otherwise treating portions of the human body by continuously and alternately and preferably automatically, applying and releasing pressure to and from small alternating areas of the patient's body with or without actually shifting the position of the body to thereby aid circulation.

The major, but not the only application of the invention is to provide an inexpensive, foolproof and simple device for continuously and alternately, and preferably automatically, elevating and lowering the opposite sides of a bedridden patient, as has been heretofore accomplished manually by nurses by rolling one side of a patient up and supporting the patient in this position with pillows for a period of time and then lowering that side of the patient by removal of the pillows and lifting the opposite side of the patient and supporting the patient in this position for a period of time with pillows. This manual shifting of the patent's body requires substantial amounts of the nurse's time which has, for many years, presented a problem in light of the shortage and relatively high cost of nurses.

The need for thus changing the position of bedridden patients at regular intervals has long been recognized to reduce the possibility of pooling of fluids in the lungs and to stimulate better circulation, but too often this attention to the patient is neglected or practiced in a very minimal degree due to the substantial time required of busy nurses. The need for this type of care applies to almost any bedridden patient, post surgical, iron lung cases, paraplegics, and many others. So long as this need has existed, there also has existed the need for freeing nurses from the substantial amounts of their time required to manually and periodically shift the patient's position and the need to insure against complications to the patient by failure of nurses to shift the position of the patient often enough either because of lack of time, lack of adequate personnel or through negligence. The present invention fills these long felt needs by providing for the periodic and continuous shifting of position of the bedridden patient, preferably automatically in accordance with a predetermined time cycle. This is achieved by an inexpensive, simple and foolproof device embodying flexible inflatable and deflatable cells, which are located under opposite sides of the patient and which are alternately and continuously, and preferably automatically, inflated and deflated according to a predetermined cycle, to thereby cyclically shift the position of the patient, thereby eliminating the necessity for nurses to do this. Accordingly, substantial amounts of nurses' time are saved and the danger of patients not being shifted often enough due to busy nurses or the lack of sufficient nursing staffs is eliminated.

A unique feature of this invention is the use of two inexpensive turbine type compressor pumps which are alternately activated in accordance with a predetermined cycle to alternately inflate and deflate the flexible patient shifting cells according to such cycle. Each compressor pump, when activated, blows air from the atmosphere into a cell to inflate it, but when deactivated, allows free passage of gas from the cell through the compressor in the reverse direction to thereby deflate the cell, thus avoiding the need of any kind of shifting control valving mechanism as has been necessary in previous types of alternating pneumatic devices. In effect, there is communication between the cells and the atmosphere through the turbine type compressors at all times during operation.

In a preferred aspect of the invention, the degree of inflation of the cells is controlled by controlling the speed of the pump motor and hence the pressure built up in the cells and means is provided to prevent overheating where the period of inflation of the cells persists after the pressure in the cells is built up to controlled set pressure during which the pump continues to rotate or slip without the movement of air therethrough.

Although in a preferred embodiment of the invention the cells are applied to opposite sides of the patient to alternately elevate and lower such opposite sides to thereby turn the patient, they may also be applied to other parts of the body, e.g. one cell under the legs and the other under the back and head, or one cell under one leg and the other cell under the other leg, to alternately, continuously and periodically shift the position of one part of the body with respect to another.

Further objects of the invention will appear in the following specification and drawings of preferred embodiments of the invention, and the novel features set forth in the appended claims.

Detailed description

In the figures, the numeral 1 represents a conventional hospital bed having a convention spring 1a and matterss 1a'. Mattress 1a' is provided with a cloth or plastic mattress cover 1b, which has a pair of longitudinal pockets 1c and 1d, extending along the length of the mattress cover, and which may be provided with a marginal portion 1e folded under the mattress. The pockets 1c and 1d are provided by sewing a pair of panels 1f and 1g to a conventional mattress cover as shown. The width of each of the pockets 1c and 1d is about one half the width of the mattress so that one pocket covers about half the mattress and the other pocket covers the other half.

Figure 1:
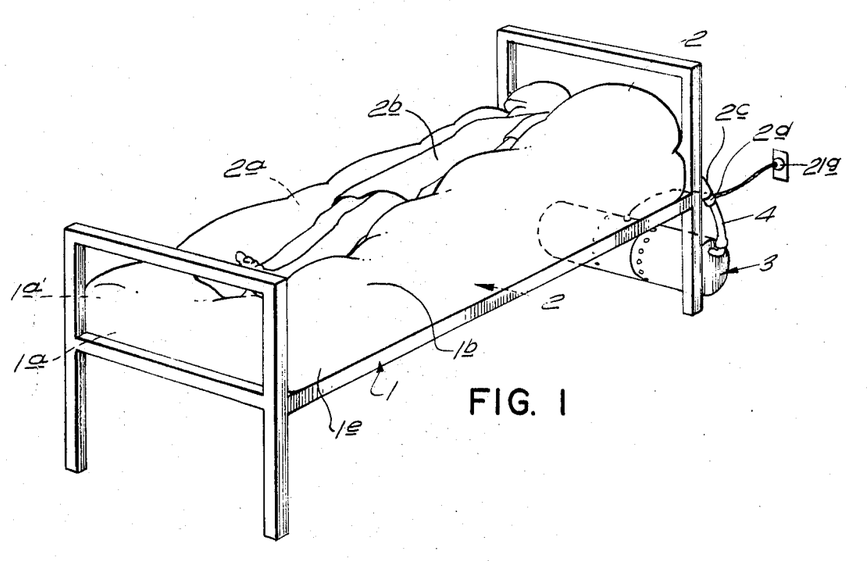
FIG. 1 is a view in perspective of a conventional hospital bed on which a patient is lying and which incorporates an embodiment of the present invention to automatically and alternately elevate opposite sides of a patient's body according to a predetermined cycle.
Figure 2:
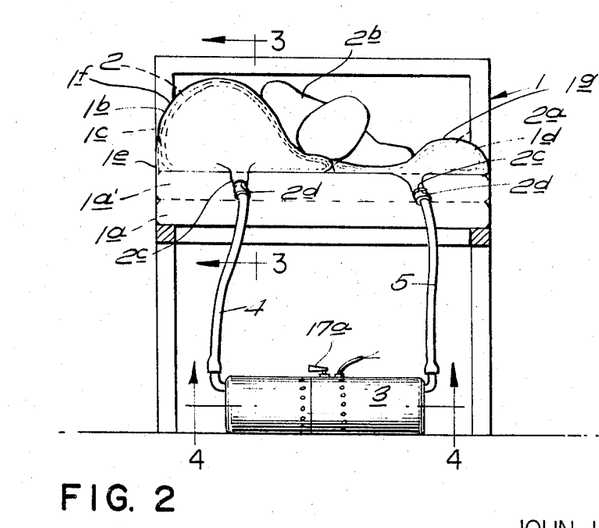
FIG. 2 is an end view in elevation of the embodiment of FIG. 1.
Figure 3:
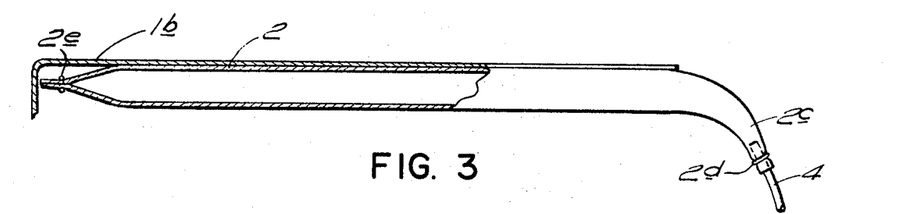
FIG. 3 is a section taken along the line 3—3 of FIG. 2.
Figure 14:
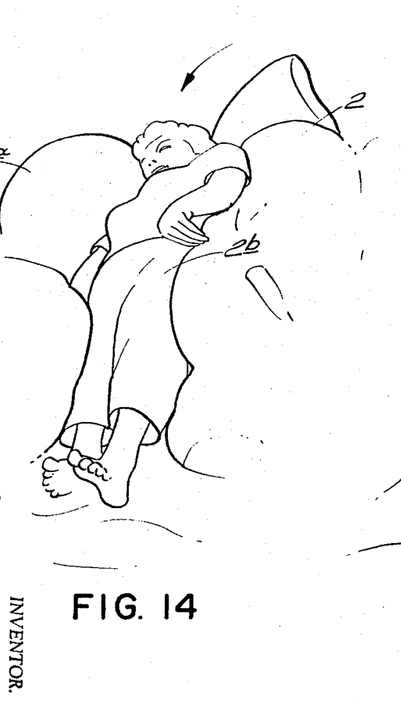
FIG. 14 is a view in perspective showing the patient with her left side elevated during one phase of the cycle.
Figure 16:
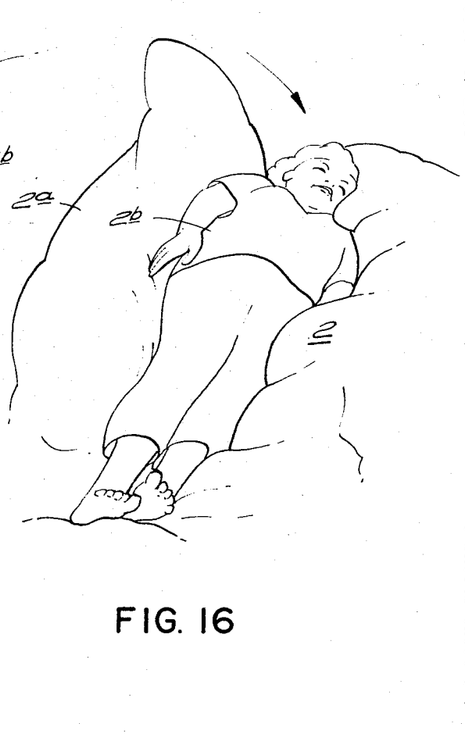
FIG. 16 is a view like FIG. 14 but with the right side of the patient elevated during the other phase of the cycle.

Located within each of the pockets 1c and 1d is an elongated, collapsible and inflatable tube or cell 2 and 2a of thin, flexible, air impermeable sheet material of plastic (e.g. cellophane, polyethylene, polyvinyl chloride, etc.) rubber, rubberized cloth or plastic impregnated cloth. The two tubes 2 and 2a extend along the length of the top of the mattress on opposite sides thereof and are automatically, continuously and alternately inflated and deflated in accordance with a predetermined time cycle by means of a pump and timing mechanism 3, located on the floor having a pair of flexible conduit hoses 4 and 5 extending from opposite ends thereof, one hose 4 extending into an end of one of the inflatable cells 2 and the other hose 5 extending into the corresponding end of the other inflatable cell 2a. In FIGS. 1 to 3, cell 2 is shown inflated and cell 2a is shown deflated. It may be observed from FIGS. 1 and 2 that when either of the cells 2 or 2a is deflated and flat it covers about one half of the mattress from the longitudinal edge of the mattress to about the center line of the mattress, i.e. one side of the top of the mattress, although this particular division is not critical. Thus, the patient 2b lies on both the cells 2 and 2a, one side of the patient lying on one cell and the other side lying on the other cell. Accordingly, when one cell, e.g. 2 in FIGS 1, 2 and 14 is inflated and the other cell, e.g. 2a in FIGS. 1, 2 and 14 is deflated during one phase of the cycle, the patient is moved automatically by the cells to an inclined position with one side of the body (the side under the inflated cell 2) elevated with respect to the other (the side under the deflated cell 2a), as shown in FIGS. 1, 2 and 14, and during the next phase of the cycle when the cell 2a is inflated and the cell 2 deflated, the position of the patient's body is automatically changed so that it is inclined in an opposite direction with the other side elevated with respect to the one side, as shown in FIG. 16, i.e. the other side is moved up and the one side is moved down. In this way, the orientational position of the patient's body can be continuously changed automatically to thereby eliminate the necessity of a nurse changing the patient's position by changing the pillows used to prop his sides up.

The end of each of the tubular cells 2 and 2a into which the flexible hose 4 or 5 extends is squeezed or clamped tightly around the hose at 2c to provide an airtight connection between cell and hose and is held in this position either removably by a clamp 2d or wire or rope or permanently by sealing with solvent or cement or heat the thermoplastic cell to the hose. The opposite end of each of the cells is closed in an air-tight manner either by a clamp 2e or wire or by sealing so that the cells are sealed against the atmosphere except through the hoses 4 and 5.

Figure 9:
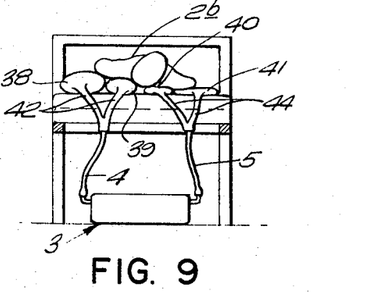
FIG. 9 is a view like FIG. 2 showing the use of multiple cells instead of a single cell for alternately lifting each side of the patient.

The cells are preferably long enough to extend along the length of the patient's body and the cross-sectional dimension thereof should be large enough to alternately elevate opposite sides of the patient to a substantial height so that the inclination of the patient is substantial, i.e. sufficient to avoid pooling of fluids in the lungs and to stimulate circulation. The relaxed cross-sectional dimension of each of the cells, i.e. the horizontal width, should also be great enough so that is underlies a sufficient portion of the body to comfortably lift a side thereof when inflated. Preferably the cell should underly approximately half of the patient's body when inflated for the sake of comfort. It is noted in FIG. 2 that the weight of the side of the body as it is lifted, deforms the inflated cell so that the top thereof is inclined along the width of the side of the body under which the cell is located. In this way, the top of the cell comfortably conforms to the underside of the body along a substantial portion of the width of the side of the body under which the cell lies. It can be seen that if the cell is made relatively narrow so that it is located under only a small portion of the outer side of the body, this would be uncomfortable for the patient since a substantial part of his body inwardly of the cell would not be supported. A width of the relaxed flattened cell of twenty inches has proved satisfactory, although the invention is by no means limited to this dimension. The same effect can be achieved by a plurality of cells of different sizes under each side of the patient, as shown in FIG. 9. The main consideration is that the cells should be of sufficient cross-sectional size to bodily lift the side of the patient to a sufficient elevation to prevent pooling of fluids and to facilitate circulation, such an elevation being well known to those skilled in the medical arts, and to provide comfortable support for a substantial portion of the side of the body being lifted. The size of the pockets 1c and 1d are, of course, adequate to permit the aforesaid inflation of the cells. It may be seen that the cell collapses under the weight of the patient when it is deflated. The cell material need not be, but can be, stretchable. When a nonstretchable material is used, the size of the relaxed cell should be such as to permit expansion or inflation to the size referred to above.

The use of a plurality of automatically alternating inflating and deflating cells for massaging parts of the body is described in U.S. Patent No. 2,460,245 but in this construction and size and location of the cells do not perform the function of bodily shifting the position of the patient to change his orientation in space.

Figures 4, 5, 5A, 6:
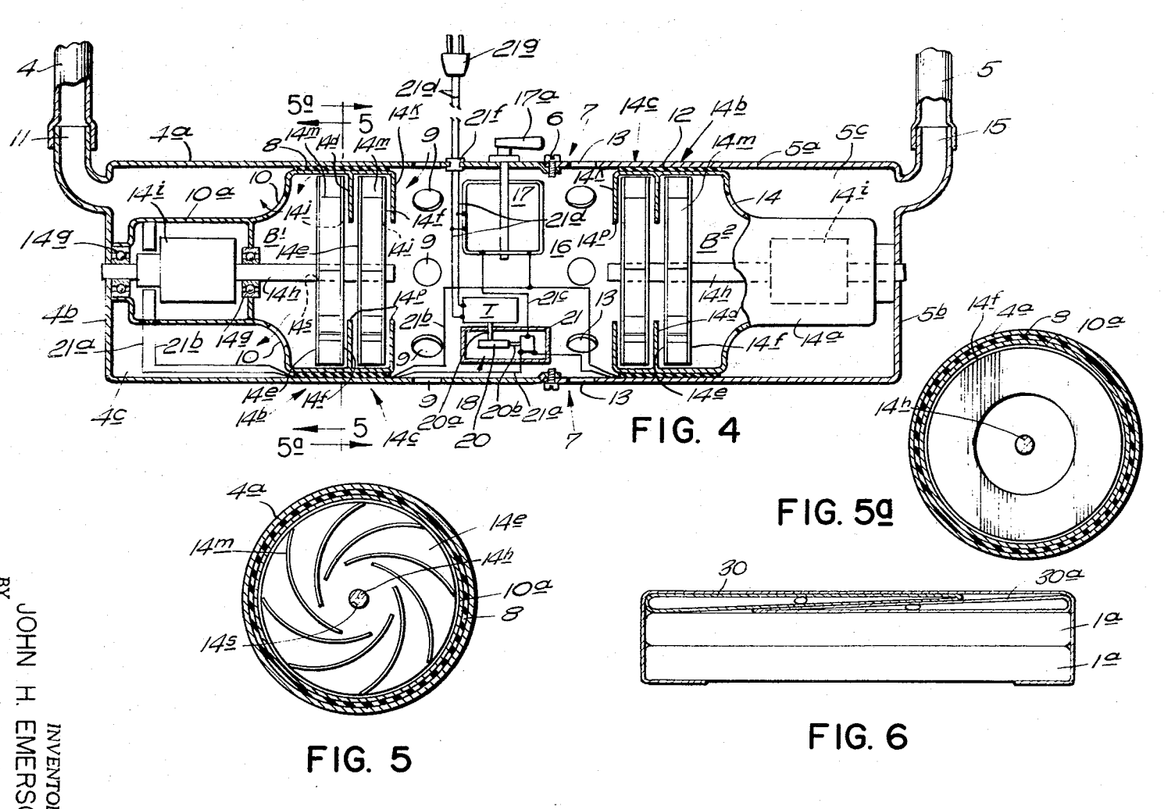
FIG. 4 is a section taken along the line 4—4 of FIG. 2 through the pump mechanism showing the internal components thereof.
FIG. 5 is a section taken along the line 5—5 of FIG. 4.
FIG. 5a is a section taken along the line 5a—5a of FIG. 4.
FIG. 6 is a view like FIG. 2 of another embodiment of the inflating cells of the invention in which one cell overlaps the other.

Pump mechanism 3 (FIGS. 1 and 2) are shown cut away in FIG. 4. The open end of a cylindrical pump housing 4a is connected in an air tight manner to the open end of a second cylindrical pump housing 5a at the telescoped overlapping area 7 by means of screws 6 extending through both housings, the two housings being axially aligned. The opposite ends of the two housings are closed in an air tight manner by walls 4b and 5b, respectively, except for ports 11 and 15, respectively, to which hoses 4 and 5 are connected, respectively, in an air tight manner.

A conventional, centrifugal, turbine type, electric motor-driven, two-stage blower unit $B^1$ is pressed into housing 4a with an air tight, rubber gasket seal 8 so that blower $B^1$, when activated, draws air from the atmosphere through openings 9 in housing 4a and discharges it into the closed end portion 4c of housing 4a through ports 10 in the pump casing 10a and thence through outlet port 11 into conduit 4 and cell 2 to inflate the cell.

A duplicate centrifugal, electric motor-driven two-stage blower unit $B^2$ is pressed into housing 5a with an airtight rubber gasket seal 12 so that blower $B^2$, when activated, draws air from the atmosphere through openings 13 in housing 5a and discharges it into closed end portion 5c of housing 5a through ports 14 in the pump casing 14a, and thence through outlet port 15 into conduit 5 and cell 2a to inflate the cell.

Each blower has two stages 14b and 14c separated by a circular baffle plate 14d extending radially inwardly from, and fixed to, the pump casing 10a in the case of $B^1$ and 14a in the case of $B^2$. Another circular baffle plate 14k is also provided at the inlet of each blower in front of the first stage 14c and it also extends radially inwardly from and is attached to the pump casing. Each of the baffles has a central circular opening 14p through which air passes. Each stage is made up of two parallel, circular discs 14e and 14f having a plurality of spirally disposed turbine buckets or blades 14m located therebetween, fixed thereto and spaced circumferentially therearound. The assembly of the two discs and turbine buckets therebetween is fixedly mounted for rotation in its pump casing (10a in the case of $B^1$ and 14a in the case of $B^2$) on a shaft 14h, rotatably mounted by means of two sets of bearings 14g in the pump casing and driven by an electric motor 14i also mounted in the pump casing. The shaft 14h extends through and is fixed in a hole 14s in disc 14e of each disc and bucket assembly, which hole 14s fits snugly around tthe shaft. Each disc 14f has a central circular opening 14j, which is substantially greater in diameter than the shaft 14h and through which air passes. The diameters of central openings 14j are about the same as the diameters of central openings 14p in the baffle plates 14d and 14k. The peripheral edges of the rotating discs 14e and 14f of each blower stage are spaced radially inwardly from the pump casing, as shown, to form passages for flow of air.

When the motor 14i of blower $B^1$ is energized to rotate the two disc and bucket assemblies of the two stages 14b and 14c of the blower, the rotating assemblies draw air through holes 9 and thence into the central openings 14p and 14j in baffle plate 14k and disc 14f, respectively of the first blower stage 14c of blower $B^1$. The air is then whirled radially and spirally outwardly by the rotating turbine buckets 14m of the first stage and then axially through the space between the periphery of disc 14e of the first stage and the pump casing 10a, and then radially inwardly between disc 14e of the first stage and baffle 14d and thence axially through the central openings 14p and 14j in baffle 14d and disc 14f of the second stage 14b, respectively, whereupon the air follows the same route in the second stage of blower $B^1$ as in the first stage and is finally blown out the holes 10 of casing 10a into the cell 2 to inflate the cell. When one of the two blowers $B^1$ and $B^2$ is energized, the other is deenergized and hence is stopped so that the disc and bucket assemblies thereof are stationary. Suppose that the blower $B^1$ has just been energized as described above and blower $B^2$ has, at the same time, been deenergized. Air will be blown into cell 2, as aforesaid to inflate the cell with pressurized air. At the same time, the pressurized air in cell 2a (provided by the preceding inflation of cell 2a when blower $B^2$ was energized to blow air into cell 2a and blower $B^1$ was deenergized), because of the pressure differential between it and the atmosphere, will flow from cell 2a through hose 5, port 15, chamber 5c and holes 14, thence radially outwardly between stationary disc 14f of the second stage 14b of blower $B^2$ and the casing 14a, and thence around the peripheral edge of the stationary disc 14f. Thereafter, some of the air will flow radially inwardly and spirally along the stationary buckets 14m of the second stage of blower $B^2$ and then axially through the central openings in the stationary disc 14e of the second stage of blower $B^2$ and in the center baffle 14d and some will flow axially between the periphery of stationary disc 14e of the second stage and thence radially inwardly between disc 14e and baffle 14d thence axially through the central opening in 14d. From the central opening in 14d the air will flow along the same route through the first stage 14c of blower $B^2$ into chamber 16 and thence to the atmosphere through holes 13, thereby causing deflation of cell 2a. The weight of the patient expedites deflation of the cell.

When blower $B^2$ is energized and blower $B^1$ is deenergized, air is drawn from the atmosphere through hole 13 and thence through the two stages of blower $B^2$ into cell 2a to inflate the cell and the compressed air in cell 2 flows through the two stages of blower $B^1$ and through holes 9 to the atmosphere to deflate cell 2. The flow of air from the atmosphere through blower $B^2$ into cell 2a is the same as it was through blower $B^1$ when it was energized and the flow of air from cell 2 through blower $B^1$ into the atmosphere is the same as it was through blower $B^2$ when it was energized.

Chamber 16, which is formed by joining, telescoped end portions of cylindrical housings 4a and 5a and into and out of which air passes through vent holes 9 and 13, houses a conventional variable voltage regulator (variable transformer) 17 and a conventional timing switch 18.

Figure 12:
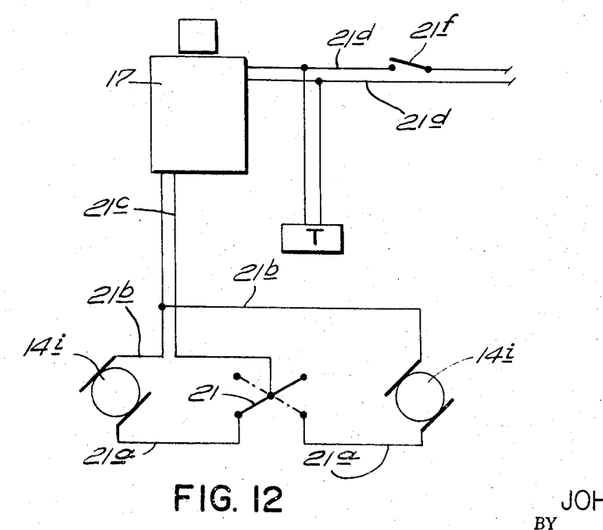
FIG. 12 shows the circuitry for the pump mechanism.

Timing switch 18 includes a conventional single pole, double throw switch 21 so designed that when one circuit is closed a second circuit is open and vice versa. The electric motors 14i are electrically connected to switch 21 through electrical leads 21a and to the voltage regulator by electrical leads 21b. The single pole switch 21 is electrically connected to the voltage regulator through electrical lead 21c. Supply current is supplied directly to variable voltage regulator 17 through electrical leads 21d, manually operated switch 21f and conventional plug 21g (adapted to be plugged into a 110 volt wall receptacle), and the regulated voltage output from the voltage regulator is then supplied to either of the motors through switch 21 and leads 21a, 21b and 21c.

The timing switch 18 also includes a timing motor T (e.g. a telechron motor). Motor T drives a cam 20 through a shaft 20a. Cam 20 contacts control button 20b of switch 21 so that during part of its rotation, switch 21 is actuated to provide current from variable voltage regulator (VARIAC) 17 (or a rheostat) to blower $B^1$ through circuit 21a, 21b and 21c and to disconnect the circuit to $B^2$, and, during another part of its rotation switch 21 is actuated to provide current from variable voltage regulator 17 to blower $B^2$ through circuit 21a, 21b and 21c and to disconnect the circuit to $B^1$. Supply current is supplied directly to the supply leads of timing motor T through electric leads 21d.

The voltage supplied to the motors through the voltage regulator can be varied by a manual control 17a to thereby vary the speed of the motors and hence the pressure built up in the inflatable cells for any given setting of the timer. The amount of inflation will, of course, depend on the pressure built up. Each of the motor circuits may be provided with its own independent variable voltage regulator. In such case, each of the regulators may be regulater differently to thereby control the relative pressure built up in the cells to raise one side of the patient more or less than the other.

Also, the timer can be regulated by a manual control (not shown) to regulate the times of the cycles. By regulating the timer, the rate of rotation of the cam 20 is varied to thereby vary the time of each cycle.

The time cycles relative to each other can be varied by varying the shape of the cam.

Although in the drawings, the cells 2 and 2a are shown as being contained in pockets in a mattress cover to hold them in place, they may be held in place by other means and, in fact, they may be merely placed on the bed under the patient, one under each side, without any special means for holding them in place other than conventional bed rails or the like. On the other hand, they may be fastened to the patient as by straps, etc.

Figure 15:
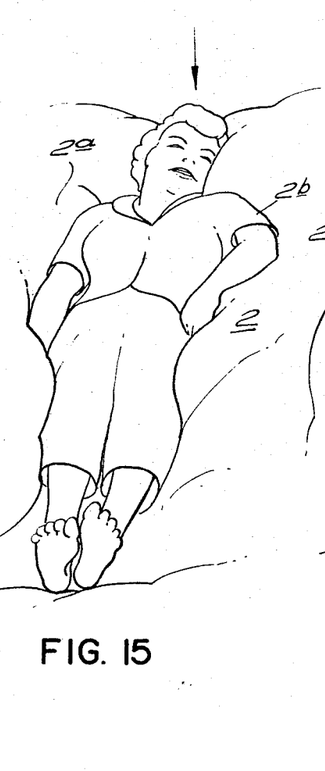
FIG. 15 is a view like FIG. 14 showing the patient in transition between the two phases of the cycle.

In use, the apparatus of FIGS 1 through 5 and 13 is operated as follows: the patient treatment cells 2 and 2a are placed on the bed and the patient put on the bed over the cells. At this point, both cells are collapsed. The two corresponding ends 2c of the cells are connected in an air tight manner by means of the flexible tubing 4 and 5 to the ports 11 and 15, respectively, of pump mechanism 3. The two cells lie flat beneath the patient so that the patient lies flat on the bed. Electric current is provided to pump mechanism 3 simply by plugging the plug 21g into a receptacle and flicking on the switch 21f mounted on the blower housing. If, at that time, the switch 21 is so positioned by cam 20 that the circuit for blower $B^1$ is closed and the circuit for blower $B^2$ is open, blower $B^1$ will draw air through ports 9 and discharge it through port 10 and port 11 into cell 2 to slowly inflate it to elevate one side of the patient's body, as shown in FIGS. 1 and 14. Cell 2a remains flat. At the same time, the timer T is actuated to rotate cam 20. Continued rotation of cam 20 finally actuates switch 21 to open the circuit for blower $B^1$ and thereby stop blower $B^1$, and to close the circuit for blower unit $B^2$, and thereby actuate blower $B^2$. Blower $B^2$ will now inflate cell 2a to elevate the other side of the patient as shown in FIG. 16. At the same time, the compressed air in cell 2 can now escape back through tube 11 and opening 10, thence backward through the stopped blower $B^1$ and finally out to the atmosphere through ports 9, to thereby lower the side of the patient over cell 2 at the same time that the side of the patient over cell 2a is being elevated. FIG. 15 shows the transition positions of the cells and patient as cell 2a is being inflated and cell 2 is being deflated by the patient's weight. In FIG. 15 cells 2a and 2 are about half inflated and deflated respectively. Continued rotation of cam 20 again reverses switch 21 to again actuate blower $B^1$, and shut off blower $B^2$ so that cell 2a now will deflate back through blower $B^2$ and cell 2 will be inflated. When the switch 21f is shut off, both blowers stop and the air in both cells escapes through the blowers to the atmosphere so that the two cells are deflated and flat under the patient.

In this way, it will be clear that first one cell is inflated while the second cell is allowed to deflate through its blower, and then the second cell is inflated while the first cell is allowed to deflate through its blower. In this way, the patient's body is continuously, automatically and alternately shifted as shown by the arrows in FIGS. 14 and 16 and in accordance with a predetermined time cycle. It can be seen that the action of the cells as they are inflated and deflated is a floating action and that is the sensation to the patient. Furthermore, the movement of body by the cells provides passive exercise, which is of extreme importance for bedridden patients.

An advantage of the invention is that automatic reversal of air flow in accordance with a predetermined time cycle is achieved without shifting control valves of any kind by the use of simple blowers which are open for flow of air therethrough when they are shut off. This makes the apparatus quite simple, inexpensive and foolproof with very little which can go wrong with it, as compared to valved devices such as those described in U.S. Patent No. 2,460,245. Furthermore, such blowers are very quiet running. Also the motors are in the air stream to and from the cells to provide a cooling effect.

In FIG. 6, the two inflatable cells 30 and 30a overlap each other at the center area of the bed. The mattress cover may be provided with pockets to receive the overlapping cells, as shown. Iu FIG. 6, both the cells are deflated and flat.

Figure 7:
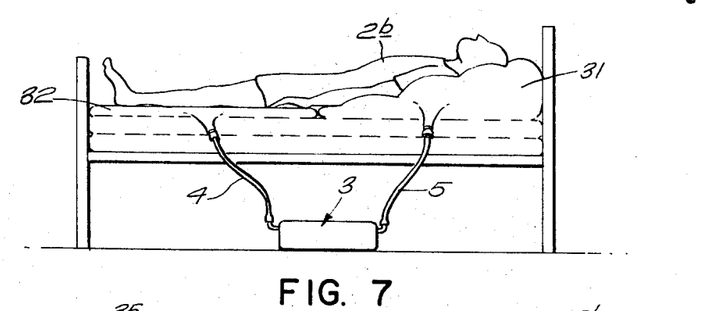
FIG. 7 is a longitudinal side view in elevation of another variation of the inflating cells of the invention in which the legs and feet and the head and shoulders of the patient are alternately raised and lowered instead of opposite sides of the patient's body.

FIG. 7 shows an embodiment of the invention where one of the inflatable cells 31 is located under the patient's feet and legs and the other cell 32 is located under the head and back, whereby the feet and legs and the back and head can be alternately elevated and lowered by the pumping mechanism 3. The cells are shown during one phase of the cycle with the cell 31 inflated and the cell 32 deflated. During the other phase of the cycle the cell 31 is deflated and the cell 32 is inflated. The mattress cover may be provided with pockets for recovering these cells.

Figure 8:
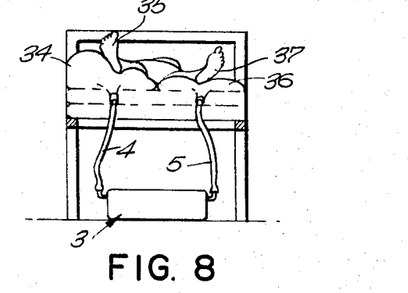
FIG. 8 is an end view in elevation showing the inflating cells used to alternately raise one leg of a patient while lowering the other and vice versa.

In FIG. 8, one of the two inflatable cells 34 is located under one foot and leg 35 and other cell 36 is located under the other foot and leg 37 to automatically and alternately elevate and lower the two legs by means of the pump mechanism 3.

The FIG. 9 embodiment is like the FIG. 2 embodiment except that instead of one cell under each side of the patient, there are two or more cells 38 and 39 of different sizes under one side of the patient and two or more like cells of different sizes 40 and 41 under the other side of the patient, there being four cells in all shown in FIG. 9. The outer cells 38 and 41 are larger in diameter than the inner cells 39 and 40. The ends of cells 38 and 39 are connected in an air tight manner with one side of the pump mechanism 3 through hose 4 with branch lines 42, and the ends of cells 40 and 41 are connected in an air tight manner with the other side of the pump mechanism 3 through hose 5 with branch lines 44. With this arrangement, the support provided by the cells to the patient's body may be more comfortable.

Figure 13:
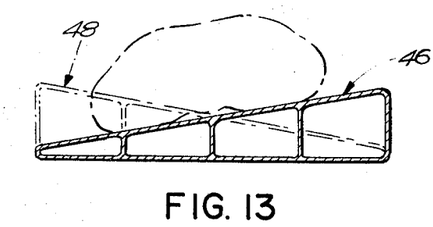
FIG. 13 shows another embodiment of the invention using multiple cells of varying sizes.

FIG. 13 shows the use of two series of cells 46 and 48, the cells in one series 46 gradually decreasing in size from the right side of the bed to the left, as viewed in FIG. 14, and the cells in the other series 48 gradually decreasing in size from the left side to right side. One series lies on top of the other and all the cells of one series are connected to one side of pump 3 and all the cells of the other series are connected to the other side of pump 3. In this way, the cells of one series support the body over substantially the entire width thereof during one phase of the cycle (during this phase all the cells of the other series are deflated) and the cells of the other series support the body over the entire width of the body during the other phase of the cycle (during this phase all the cells of the first series are deflated) with maximum comfort to the patient.

Figure 10:
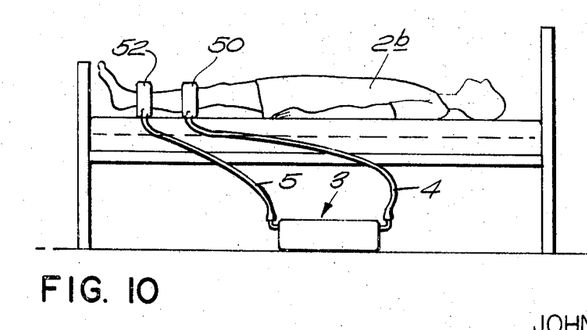
FIG. 10 shows inflating cells used to alternately apply and release pressure around a patient's leg at two different points.

In FIG. 10, the inflatable cells 50 and 52 are doughnut shaped and fit around the leg of the patient at different points on the leg, as shown, or each may be applied to a different leg. By alternately deflating and inflating the cells, pressure is alternately applied and released at the two different points on the leg or legs to aid in circulation. In this embodiment, the cells are not used to lift or move one part of the body relative to another part as in other previous embodiments. Each doughnut shaped cell may encompass an entire extremity, e.g. an entire leg.

Figure 11:
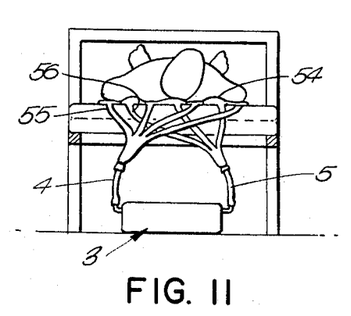
FIG. 11 is a view like FIG. 2 showing the use of multiple small inflating cells under the patient's body to alternately change pressure areas on a patient instead of actually shifting the patient's position.

In FIG. 11, the cells 54 are very small in size and there are a relatively large number of them. Alternate cells are connected with opposite sides of pump mechanism 3 through hoses 4 and 5 with branches 55 and 56 respectively, so that such alternate cells are alternately inflated and deflated as shown. However, because the cells are so small and because the inflated cells are distributed over the body, they are not effective to shift the position of one part of the body relative to another part as in FIGS. 1 to 9 and 13 to 16. Instead, they are effective to automatically, alternately and continuously apply changing pressure areas to the body to aid in circulation.

Figure 17:
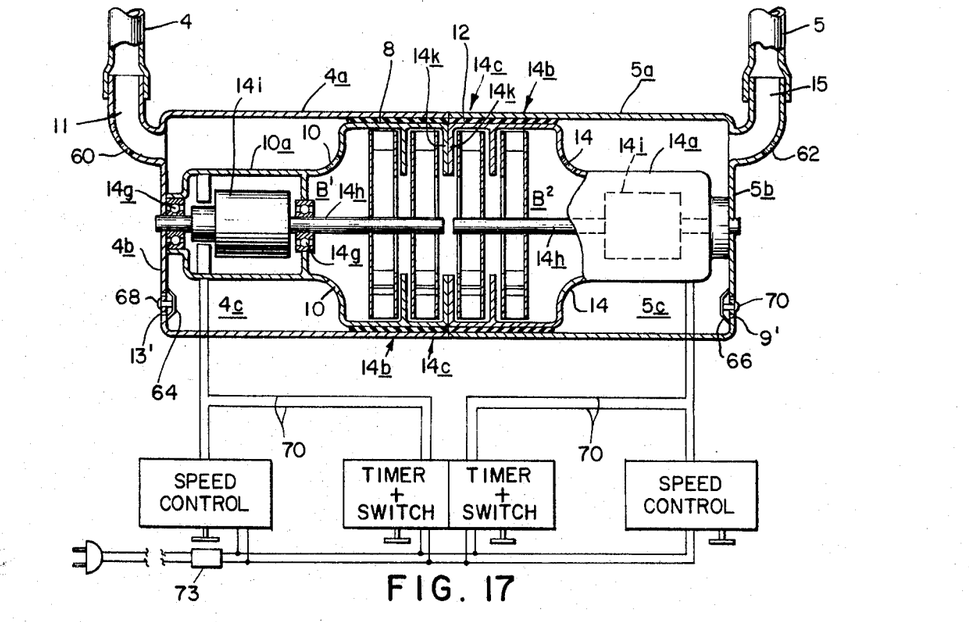
FIG. 17 is a view like FIG. 4 of another embodiment of the pump mechanism for inflating the cells.
Figure 18:
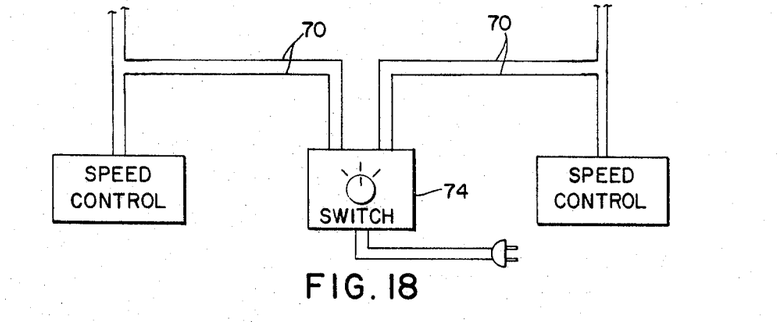
FIG. 18 is a view of a switch mechanism for controlling the pump mechanism of FIG. 17 by hand, i.e. without the use of timers.

Another embodiment of the pumping mechanism is shown in FIGS. 17 and 18. The pumping mechanism is the same in this embodiment as in the FIG. 4 embodiment except for the following differences (the mechanical elements in FIGS. 17 and 18, which are the same as in FIG. 4, are represented by the same numbers).

(1) The two pump housings 4a and 5a are shortened so that the entry plates 14K of the blower housings 10a and 14a abut each other to thereby eliminate the center space 16 between such blower housings in FIG. 4.

(2) A bleed hole, 60 and 62, is provided in the wall of each of the ports 11 and 15, respectively.

(3) A plurality of circularly arranged air inlet holes 13' is provided in the end wall 4b of housing 4a and a plurality of like holes 9' is provided in the end wall 5b of housing 5a. Holes 13' are provided with a conventional, resilient, e.g. rubber, one-way, flap diaphragm valve 64 secured to the inside of end wall 4b over the holes by means of grommet 68 to normally close the holes 13' to passage of air therethrough. Holes 9' are provided with a corresponding one-way, flap diaphragm valve 66 affixed to the inside of end wall 5b over the holes 9' by means of a grommet 70 to normally close holes 9' to passage of air therethrough.

(4) The motor 14i of each blower unit $B^1$ and $B^2$ is provided with its own adjustable speed control (voltage regulator) and its own adjustable timer and timer switch, as shown, so that the time during which each motor is operated and hence during which each cell is inflated can be separately controlled, as well as the pressure built up in such cell by the motor, i.e., the degree of inflation of each cell. The two blower motors and their timers, timing switches and speed controls are electrically connected for alternating operation of the motors by electrical circuits shown diagramatically at 70 in FIG. 17. Switch 73 is provided to turn off operation of both blowers.

In the FIG. 17 embodiment, operation of blower $B^1$ to inflate cell 2 (during this time blower $B^2$ is deenergized and hence is stationary) creates a suction in chamber 5c to open diaphragm flap valve 66 and such air through holes 9' into chamber 5c, thence through both blowers $B^2$ (stationary) and $B^1$ (rotating) consecutively, thence to port 11 and thence to cell 2 to inflate it. Also air in the previously inflated cell 2a is sucked out of the cell through the two blowers into port 11 to thereby deflate cell 2a. Also some air is sucked into the bleed hole 62 and thence through both blowers to port 11. A part of all this air discharged from blower $B^1$ into port 11 is bled to the atmosphere through bleed hole 60. This bleeding of discharge air from blower $B^1$ increases slightly the time required to build up to the set pressure in cell 2 determined by the setting of the speed control for the motor of blower $B^1$. However since the bleed hole is relatively small compared to the capacity of the pump, this increase in time is relatively small.

The air under pressure discharged from blower $B^1$ during operation of such blower urges the flap valve 64 tightly against the end wall 4b to provide a tight seal against exit of air through holes 13'.

When blower $B^1$ is deactivated or deenergized (it is stationary when it is deenergized) by its timer and timer switch and blower $B^2$ is activated or energized by its timer and timer switch to inflate cell 2a, flap valve 64 is forced open by the suction created in chamber 4c and air is sucked into holes 13', thence through blowers $B^1$ (stationary) and $B^2$ (rotating), consecutively, and thence into port 15 to inflate cell 2a. Air is also sucked out of cell 2 and thence through both blowers into port 15 to thereby deflate cell 2. Also air is sucked from the atmosphere through bleed hole 60 and thence through the blowers into port 15. A part of all this air discharged from blower $B^2$ bleeds out to atmosphere through hole 62 to increase slightly the time it takes for the pressure in cell 2a to build up to the pressure determined by the setting of the speed control for the motor of blower $B^2$.

The pump assembly of FIG. 17 has the following advantages over that of FIG. 4.

(1) During inflation of each cell, the pressure built up in such cell and hence the degree of inflation thereof depends on the speed of the motor, as determined by the setting of the speed control or voltage regulator for the motor. In many cases, it is desired to have the inflation time for the cell continue for a considerable period of time after such pressure has been built up. During this period of time, the blower for that cell continues to rotate without any further substantial build up of pressure and without further flow of new air through the blower. In effect, the blower slips in the air in the blower casing. This continued operation of the blower motor without flow of new air through the blower causes it and the blower and the air in the blower to heat up, which is highly undesirable for a number of reasons, one of which is a sharp decrease in the life of the motor and blower.

By providing the bleed holes 60 and 62, new cooling air continues to be moved through the blowers and around the motors therefor at all times during blower operation even after the set pressure has been reached and while said pressure is maintained to thereby prevent overheating. In this respect it is noted that the motors for both blowers are located in the air stream moved by each of the blowers. When blower $B^1$ is operating, this cooling air is moved into and through holes 9' and bleed hole 62 and thence through blowers $B^2$ and $B^1$ consecutively and out bleed hole 60. When blower $B^2$ is operating, this cooling air is moved into and through holes 13' and bleed hole 60 and thence through blowers $B^1$ and $B^2$ consecutively and out bleed hole 62.

Flow through the bleed holes is constant after the set pressure has been reached.

To counteract the flow of air through the bleed holes it is necessary to run the motor a little faster to reach and maintain the same pressure.

The size of each of the bleed holes is sufficiently large to move new air at a sufficient rate through the blowers, after the set pressure has been reached, to provide an adequate cooling effect but it is not so large that the time required to build up to the set pressure is excessively long. Also it is not so large that the increase in speed required to maintain the set pressure is excessive.

When both blowers are shut off, the air in the inflated cell at the time is dissipated through both the bleed holes.

(2) With the FIG. 17 arrangement the inflowing cool air moved by each blower flows through both blowers and around the motors of both blowers to cool them whereas in the FIG. 4 arrangement it flows through only one blower and around the motor of only one blower.

(3) The size of the FIG. 17 blower assembly is reduced compared with the FIG. 4 assembly by doing away with the spacing between the pump assemblies. Also, the construction is simplified. By supplying a separate timer and speed control for each motor, the degree and time of inflation of each cell can be controlled separately.

FIG. 18 shows a modification of the construction of FIG. 17 by omitting the timers, the switch 74 being operable by hand to actuate one blower and shut off the other to thereby inflate one cell and deflate the other. It has been found that in certain cases, particularly where each of the cells is to be inflated for relatively long periods, it is desirable for the operation of the two blowers to be hand controlled rather than automatic. When the switch is turned by hand in one direction, cell 2 is inflated and when turned in the other direction cell 2a is inflated. In this way the operator can control the length of each cycle.

It is noted that the pumping mechanisms of FIGS. 17 and 18 also do not embody any shifting control valves.

I claim:

1. A device for automatically and alternately shifting the position of parts of the body of a bed ridden patient with respect to each other comprising at least two inflatable and deflatable flexible, fluid confining cells, upon which the patient is adapted to be supported with one cell applied to one part of the body and the other cell applied to another part of the body and means for automatically and alternately inflating and deflating said cells according to a predetermined time cycle, said cells being so located and of such size that when one of said two cells is inflated, it is effective to elevate the part of the body to which it is applied relative to the part of the body to which the other cell is applied and so that when the other of said cells is simultaneously deflated it is effective to lower the part of the body to which it is applied relative to the part of the body being simultaneously elevated by inflation of said one cell, said device also comprising a first fluid pump with a discharge port communicating with one of said two cells, said first pump, when energized, providing means to pump compressed air into said one cell to inflate said cell, said pump, when deenergized and hence stopped, offering passage for free flow of fluid from said one cell through said first pump to thereby deflate said one cell, a second fluid pump with a discharge port communicating with the other of said two cells, said second pump, when energized, providing means to pump compressed air into said other cell, and when deenergized, offering passage for free flow of fluid from said other cell through said second pump to thereby deflate said other cell, means to alternately energize and deenergize said first pump and said second pump so that said cells are aternately inflated and allowed to deflate according to said predetermined cycle.

2. A device according to claim 1, including means for varying the speed of said pumps to control the degree of pressure delivered thereby.

3. A device according to claim 1, each of said pumps comprising a blower comprising a blower casing and a pair of parallel discs mounted for rotation in said casing on a rotatable drive shaft, said discs having a plurality of spirally disposed air pumping buckets located therebetween, attached thereto and spaced circumferentially therearound, for blowing air from the atmosphere to the pump discharge port, one of said discs having a central opening for passage of air therethrough, the peripheries of said discs being spaced radially inwardly from the blower casing, said two discs and said buckets comprising a blower stage.

4. A device according to claim 3, each of said pumps having two stages, which are axially aligned and having a common drive shaft and a common axially aligned motor for driving said drive shaft, each of said pumps also comprising a baffle plate extending radially inwardly from the blower casing between said two stages and a baffle plate extending radially inwardly from the blower casing in front of the first stage, said baffle plates having central openings for flow of air therethrough, the diameters of the central openings in said one disc of each stage and in said baffle plates being substantially greater than the diameter of said drive shaft, the other of said two discs of each stage extending radially from and being attached to the drive shaft.

5. A device according to claim 4, said pumps being supported in axially aligned spaced positions within a cylindrical housing.

6. A device according to claim 1, said means for energizing and deenergizing said pumps comprising a switch, an adjustable timer motor, a shaft driven by said timer motor to complete one revolution in a predetermined time interval for which said timing motor may be set, a cam mounted on said timer shaft and positioned for operation of said switch in accordance with a predetermined cycle to alternately energize and deenergize said pumps.

7. A device according to claim 6, said means for energizing and deenergizing said pumps comprising a motor for each pump and adjustable means for regulating the voltage to said motors to thereby alter the pressures alternately delivered to said cells.

8. A device according to claim 7, each of said pumps comprising a blower comprising a pair of discs having a plurality of spirally disposed buckets located therebetween attached thereto and spaced circumferentially therearound, said discs being mounted on a rotatable shaft driven by the motor of said pump, each of said pumps being mounted within a cylindrical housing in axially aligned spaced relation with respect to each other, said timer, switch and voltage regulator being mounted in said housing.

9. A device according to claim 1, said cells overlapping each other.

10. A cell according to claim 1, each of said cells comprising an elongated inflatable tube extending longitudinally along the patient's body, at least one cell being located under one side of the patient and at least one other cell being located under the other side of the patient, whereby when one of said cells is inflated and the other is deflated, the side of the body under which said one cell is located is elevated and the side of the body under which said other cell is located is lowered.

11. A device according to claim 1, each of said cells comprising an elongated tube extending longitudinally along the patient's body, a plurality of said cells of different sizes being located under each side of the patient, all the cells under one side being alternately inflated and all of the cells under the other side being alternately deflated at the same time.

12. A device according to claim 1, at least one of said cells being located under the feet and legs of said patient and at least another of said cells being located under the head and back of the patient to alternately raise and lower the same with respect to each other.

13. A device for alternately and continuously inflating first and second inflatable and deflatable cells; comprising a first fluid pump with a discharge port communicating with said first cell, said first pump, when energized, providing means to pump compressed air into said first cell to inflate said cell, said first pump, when deenergized and hence stopped, offering passage for free flow of fluid from said first cell through said pump to thereby cause deflation of said first cell, a second fluid pump with a discharge port communicating with the second cell, said second pump, when energized, providing means to pump compressed air into said second cell, and when deenergized, offering passage for free flow of fluid from said second cell through said second pump to thereby cause deflation of said second cell, means to alternately energize and deenergize said first pump and said second pump so that said cells are alternately inflated and allowed to deflate.

14. A device according to claim 13, including means for varying the speed of said pumps to control the pressure delivered thereby.

15. A device according to claim 13, each of said pumps comprising a blower casing and a blower comprising a pair of parallel discs mounted for rotation in the blower casing on a rotatable drive shaft and having a plurality of spirally disposed air pumping buckets located therebetween, attached thereto and extending circumferentially therearound for blowing air from the atmosphere to the pump discharge, one of said discs having a central opening for passage of fluid therethrough, the peripheries of said discs being spaced radially inwardly from the blower casing to permit the passage of air therebetween.

16. A device according to claim 15, said two discs and buckets comprising a blower stage, each of said pumps having two stages, the blowers of the two stages being axially aligned and having a common drive shaft and a common axially aligned motor for driving said drive shaft, a baffle plate extending radially inwardly from the blower casing and located between said two stages and another baffle plate extending radially casing in front of the first stage, said baffle plates having central openings for flow of fluid therethrough, said central openings in said one disc of each stage and in said baffle plates being larger in diameter than the diameter of said shaft, the other of said two discs of each stage extending radially from and being attached to the drive shaft.

17. A device according to claim 13, said means for alternately energizing and deenergizing said pumps comprising a switch, an adjustable timer motor, a shaft driven by said timer motor to complete one revolution in a predetermined time interval for which said timing motor may be set, a cam mounted on said timer shaft and positioned for operation of said switch in accordance with a predetermined time cycle to alternately energize and deenergize said pumps.

18. A device according to claim 17, said means for energizing and deenergizing said pumps comprising a motor for each pump, and adjustable means for regulating the voltage to said motors to thereby alter the pressures alternately delivered to said cells.

19. A device according to claim 17, said pumps being supported in axially aligned, spaced positions within a cylindrical housing, said timer motor, cam and switch being located within said housing.

20. A device according to claim 13, including means to regulate the speeds of said pumps to regulate the pressure built up in said cells during inflation of each cell, whereby when said pressure is built up the pump for said cell continues to operate without increasing substantially the pressure in said cell, and means for bleeding a small amount of air discharged by said pump to thereby provide a flow of air through said pump after said pressure has been built up and during said continuing operation of said pump.

21. A device according to claim 20, the motor for each of said pumps being located in the air stream pumped by said pump to thereby cool said motor.

22. A device according to claim 13, the motors of both said energized and deenergized pumps being located in the aid stream pumped by the energized pump to thereby cool said motors, said air stream being moved by said energized pump through both of said pumps.

23. A device according to claim 13, the inlets of said pumps being in communication with each other so that each pump, when energized, moves air from the atmosphere through both pumps and around the motors therefor to the discharge port of said energized pump, the air flow through the deenergized pump being from its discharge end to its inlet end and thence to the inlet of the energized pump.

24. A device according to claim 23, said pumps being housed in housing means having an opening to the atmosphere located at the discharge side of each of said pumps, each of said openings having a one way valve permitting entry of air into said housing means but preventing exit of air out of said housing means, whereby when each of said pumps is energized, it sucks air from the atmosphere through the opening at the discharge side of the other deenergized pump and through both pumps.

25. A device according to claim 23, also including means for bleeding off a part of the air discharged from the energized pump.

26. A device according to claim 25, said energized pump sucking air into the means for bleeding off air discharged from the deenergized pump and thence through both pumps to the discharge side of the energized pump, said energized pump also withdrawing air from the cell being deflated and thence through both pumps to the discharge side of the energized pump.

27. A device for alternately and continuously inflating first and second inflatable and deflatable cells, comprising a fluid pump and motor therefor with a discharge port communicating with said first cell, said pump, when energized, providing means to pump compressed air from the atmosphere through said pump and around the motor therefor into said first cell to inflate said cell, said first pump, when deenergized and hence stopped, offering passage for free flow of air from said first cell, means for controlling the speed of said motor to control the maximum pressure delivered to said cell, said pump continuing to operate after said pressure has been reached without substantially increasing said pressure, means for bleeding a part of the air discharged from said pump to thereby move a stream of cooling air through said pump and around said motor after said pressure has been reached and the pump continues to operate.

28. A pump according to claim 27, said pump being connected to said second cell to remove air from said second cell and pump it to said discharge port, said pump being located in a housing having an opening with a one way valve permitting air to be sucked into said housing through said opening but not to be forced out of said opening, the operation of said pump sucking air from the atmosphere through said opening and thence through the pump and to said first cell to inflate said cell.

References Cited

UNITED STATES PATENTS

| | | | |
|---|---|---|---|
| 1,281,995 | 10/1918 | Moss | 230—2 |
| 1,635,318 | 7/1927 | Frey | 230—2 |
| 1,772,310 | 8/1930 | Hart | 5—91 |
| 2,769,182 | 11/1956 | Nynlist | 5—68 |
| 3,300,793 | 1/1967 | Thompson | 5—61 |
| 3,330,598 | 7/1967 | Whiteside | 297—284 |

CASMIR A. NUNBERG, Primary Examiner

U.S. Cl. X.R.

5—91, 348; 128—33; 230—2; 297—284